United States Patent [19]
Stefanov et al.

[11] Patent Number: 5,963,289
[45] Date of Patent: Oct. 5, 1999

[54] ASYMMETRICAL SCRIBE AND SEPARATION METHOD OF MANUFACTURING LIQUID CRYSTAL DEVICES ON SILICON WAFERS

[75] Inventors: Michael E. Stefanov, Stow; John H. Erdmann, Hudson; Christopher Frank, Kent; Yimin Ji, Hudson, all of Ohio

[73] Assignee: S Vision, Santa Clara, Calif.

[21] Appl. No.: 08/957,984

[22] Filed: Oct. 27, 1997

[51] Int. Cl.⁶ ............................................. G02F 1/13
[52] U.S. Cl. .............................................. 349/187
[58] Field of Search ................................. 349/187

[56] References Cited

U.S. PATENT DOCUMENTS 5,832,601  11/1998  Eldridge et al. .................. 29/843

*Primary Examiner*—Hung Dang
*Assistant Examiner*—Robert J. Hollingshead
*Attorney, Agent, or Firm*—Calfee, Halter & Griswold LLP

[57] ABSTRACT

A method of manufacturing liquid crystal on silicon devices uses asymmetric placement of scribes on silicon and glass substrate layers to maximize the yield of processed active matrix silicon wafers. Asymmetrical scribing minimizes a dimension from a gasket seal between the substrates to a lower bond pad edge. An opposite glass overhang provides an interconnect redundancy for an ITO plate or a repair site for electrical contact to the ITO plate. Methods of device separation employing partial sawing are also employed.

16 Claims, 3 Drawing Sheets

ASYMMETRICAL SCRIBE AND SEPARATION METHOD OF MANUFACTURING LIQUID CRYSTAL DEVICES ON SILICON WAFERS

FIELD OF THE INVENTION

The present invention pertains generally to the manufacture of silicon-based liquid crystal devices and, more particularly, to material efficient methods of mass production of silicon-based liquid crystal devices.

BACKGROUND OF THE INVENTION

Design rules for high yield in the scribe and separate processes in the manufacture of liquid crystal devices (LCDs) require a ratio of 5:1 (area to substrate thickness) for removing a section of one substrate relative to another when a contact ledge is required on the device. The present invention avoids this limitation and thereby eliminates the waste of expensive processed silicon substrate as a non-functional area to maintain this required ratio.

Silicon real estate is the most expensive component in a Liquid Crystal On Silicon (LCOS) device. In conventional die layouts, the necessary ledge dimension for a 0.7 mm glass counter-electrode plate would be 3.5 mm. Typical wedge bonding requirements place this ledge dimension at less than 1 mm. Therefore, even in the most lenient of designs for the bond pad ledge, an additional non-functional area of 2.5 mm multiplied by the width of silicon is required just to satisfy the requirements for glass scribing and removal.

SUMMARY OF THE INVENTION

The present invention provides an improved method of mass manufacturing liquid crystal on silicon (LCOS) devices which greatly reduces the amount of processed silicon substrate required. In accordance with one aspect of the invention, there is provided a method of manufacturing a plurality of liquid crystal devices on a silicon substrate which includes the steps of providing a substrate in the form of a silicon substrate having a plurality of processed dies, each die containing an active matrix of display addressing functions for a liquid crystal device, the dies arranged in a generally orthogonal array on the silicon substrate with horizontal and vertical scribe streets between the dies; preparing the silicon substrate for attachment to a glass substrate; preparing a glass substrate for attachment to the silicon substrate; dispensing a sealant material on the silicon substrate; attaching a glass substrate to the silicon wafer by contact with the sealant material; forming horizontal scribes in the horizontal scribe streets in the silicon substrate and vertical scribes in the vertical scribe streets in the silicon substrate; forming vertical scribes in the glass substrate which coincide with the vertical scribe streets in the silicon substrate, and forming horizontal scribes in the glass substrate adjacent to the horizontal scribe streets in the silicon substrate, whereby the horizontal scribes in the glass substrate intersect each of the dies in a horizontal row in the generally orthogonal array of dies on the silicon substrate; forming parts by separating the glass substrate and silicon substrate along the respective scribes, and filling the parts with liquid crystal material between the glass and silicon substrates and sealing the parts between the substrates to form a liquid crystal device.

In accordance with another aspect of the invention, asymmetrical layout of the die on a wafer can greatly reduce the amount of silicon needed in satisfying the industry established 5 to 1, width to thickness ratio, for removing glass above the bond pad ledge. By arranging the die in an asymmetrical format, bond pad ledge to bond pad ledge, the non-functional area required on each device is greatly reduced. Using the above example, the distance from opposing device gasket seal to gasket seal must be 3.5 mm. Assuming that the bond pad ledge is 1 mm and the scribe streets are 200 microns would require that the non-functional area be 0.65 mm. This is a savings over the conventional layout of almost 400%.

These and other aspects of the invention are herein described in particularized detail with reference to the accompanying Figures.

DETAILED DESCRIPTION OF PREFERRED AND ALTERNATE EMBODIMENTS

Figure 1:
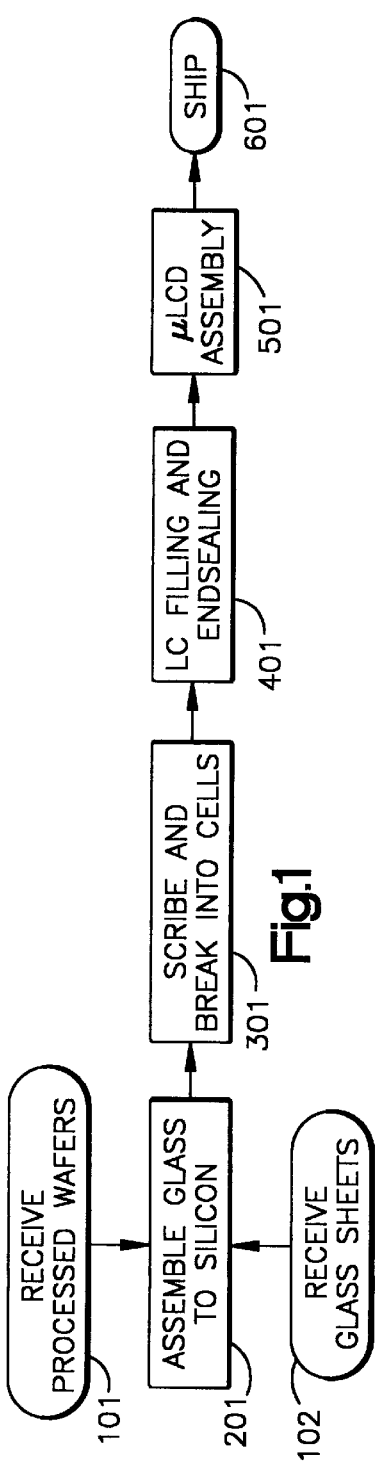
FIG. 1 is a flow diagram of a liquid crystal on glass (LCOS) device manufacturing process.

Silicon wafers with processed die are delivered to a Wafer Scale Assembly (WSA) process as one of two processed substrates. The active matrix which controls the display addressing functions has been processed in the silicon wafer at a semiconductor foundry prior to further processing. As schematically shown in FIG. 1, the processed wafers 101, and glass sheets 102 are assembled at step 201, scribed and broken into cells at step 301, filled with liquid crystal material and endsealed at step 401, assembled into a device which incorporates an LCD at step 501, and shipped at step 601.

Figure 2:
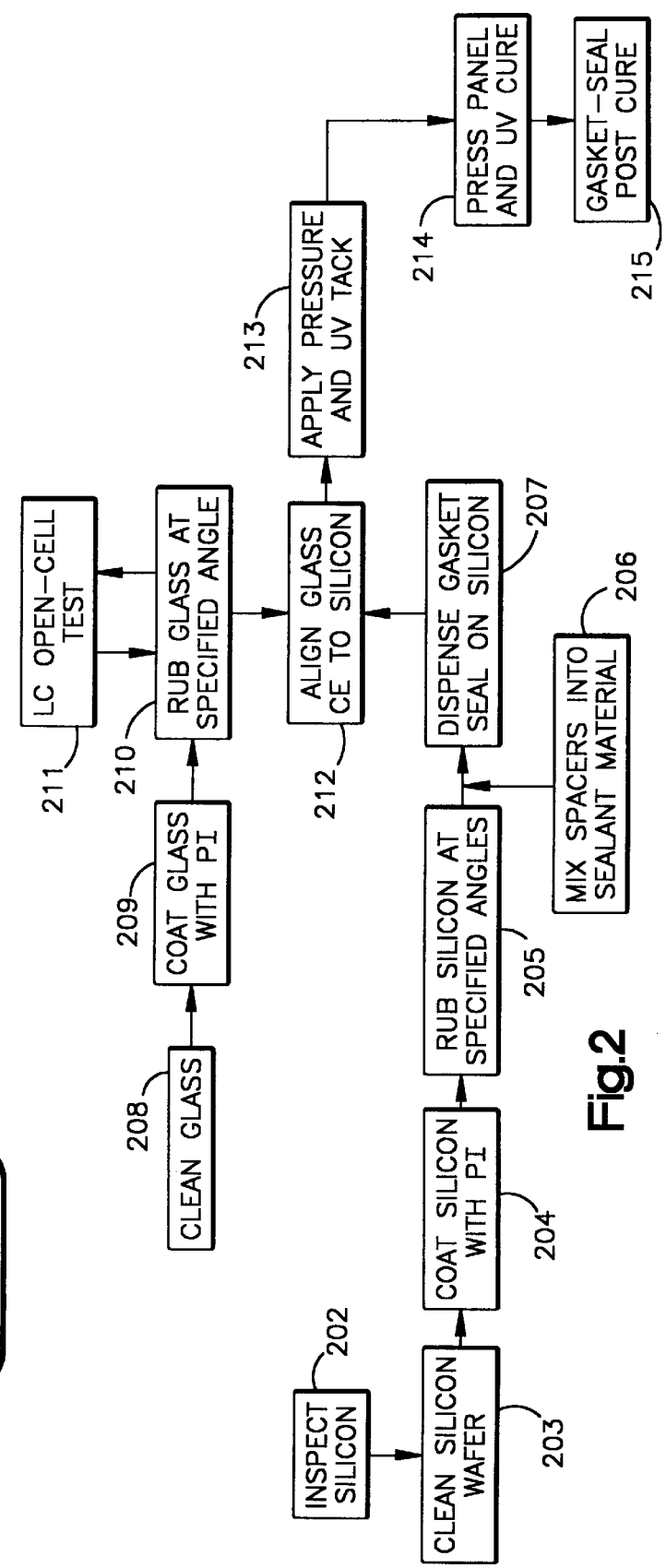
FIG. 2 is a flow diagram of stage 201 of FIG. 1 of assembly of a glass substrate to a silicon substrate.

As further described with reference to FIG. 2, incoming silicon wafers are inspected at step 202 for visual defects, scratches, particles, etc. Electrical probing of the die on the wafer may also be done as an incoming quality control (IQC) to verify the correctness of the wafer map. Inspected wafers are then sent to be cleaned at step 203. Glass and wafers are process through industry standard cleaning processes. These include scrubbing, brushing or ultrasonic cleaning in a solvent, surfactant solution, and/or de-ionized (DI) water. The surfactant and DI water baths are typically heated 20–70 degrees centigrade above room temperature. Solvent cleaning is typically done at room temperature. Drying is done either with a hot air knife, hot air jet, or an infrared or convection type oven.

The glass is cleaned at step 203. At steps 204 and 209, the wafers and glass are coated with polyimide (PI). The polyimide coating process follows the standard industry processes of spin coating or offset printing but could be implemented by more esoteric means such as spraying or meniscus coating. Offset printing is the preferred method since the polyimide alignment coating is only applied to the active area of the device. This is achieved through the design of the print matte.

At steps 205 and 210, the silicon and glass is rubbed at specified angles: Molecular alignment of the liquid crystal is achieved through the industry established process of mechanical rubbing of the polyimide surface with a deflocked cloth. In this particular case, the cloth is antistatic. These are in common usage in AMLCD Fabs. The specific angle at which the part is rubbed is application specific. The rub wheel pressure and number of passes is process dependent. More esoteric alignment processes like inorganic deposition (obliquely evaporated $SiO_2$) and optical polarization dependent schemes are also applicable. It is a common practice in the industry to provide in the process testing at the rubbing step in the form of an LC open cell test at step 211. In this case it would be done on the glass substrate where its purpose is to insure that sufficient contact is made between the rubbing cloth and the polyimide surface. This gate is applicable to the more esoteric alignment processes listed above as well.

Spacers are mixed into sealant material at step 206: The small format of the μLCD (<20 micron pixels) requires that the image be magnified and presented to the viewer by some optical means. Spacers in the form of spheres or rods are typically dispensed and dispersed between the glass plates to provide cell gap control and uniformity. The small pixel format does not allow for the use of spacers in the active area in constructing μLCD's. Spacers must be dispensed in the gasket area of the display and therefore mixed into the gasket seal material prior to seal dispensing. This is achieved through normal agitated mixing processes. Spacer materials are typically mixed in a ratio of 1% to 4% ratio by weight with the gasket material.

A gasket seal material is dispensed on the silicon in a desired pattern at step 207, usually in one of two industry standard methods including automated controlled liquid dispensing through a syringe and printing (screen, offset, or roller). When using a syringe, it is moved along X-Y coordinates relative to the parts. The syringe tip is constrained to be just above the part with the gasket material forced through the needle by positive pressure. Positive pressure is provided either by a mechanical plunger forced by a gear driven configuration and/or by an air piston. This dispensing method provides the highest resolution and process control but provides less throughput. Printing the gaskets in all forms listed above is somewhat a parallel process in nature and therefore much higher in throughput. The downside is much lower line dispense resolution.

The glass substrate is aligned with the silicon substrate at step 212. Alignment of the opposing electrodes or active viewing areas requires registration of substrate fiducials on opposite substrates to typically 1 to 2 micron accuracy. This task is usually accomplished with the aid of video cameras with lens magnification. The machines range in complexity from manual to fully automated with pattern recognition capability. Whatever the level of sophistication, they accomplish the following process:

1. Dispense a very small amount of a UV curable adhesive at two locations near the perimeter and off of all functional devices in the array.
2. Align the fiducials of the opposing substrates within the equipment capability.
3. Press substrates and UV tack.

At step 213, the final cell gap is set by pressing the previously tacked laminates in a UV or thermal press. In a UV press, a common procedure would have the substrates loaded into a press where at least one or both of the press platens are quartz, in order to allow UV radiation from a UV lamp to pass unabated to the gasket seal epoxy at step 214. Exposure time and flux rates are process parameters determined by the equipment and adhesive materials. Thermally cured epoxies require that the top and bottom platens of a thermal press be heated. The force that can be generated between the press platens is typically many tons. The gasket seal is then post-cured at step 215 and hardened in an oven at 20 to 50 degrees Celcius above ambient for 4 to 24 hours. The two opposing substrates have been pressed and set on the spacer material. With thermally cured epoxies, after the initial press the arrays are typically transferred to a stacked press fixture where they continue to be pressed and post-cured for 4–8 hours.

Figure 3:
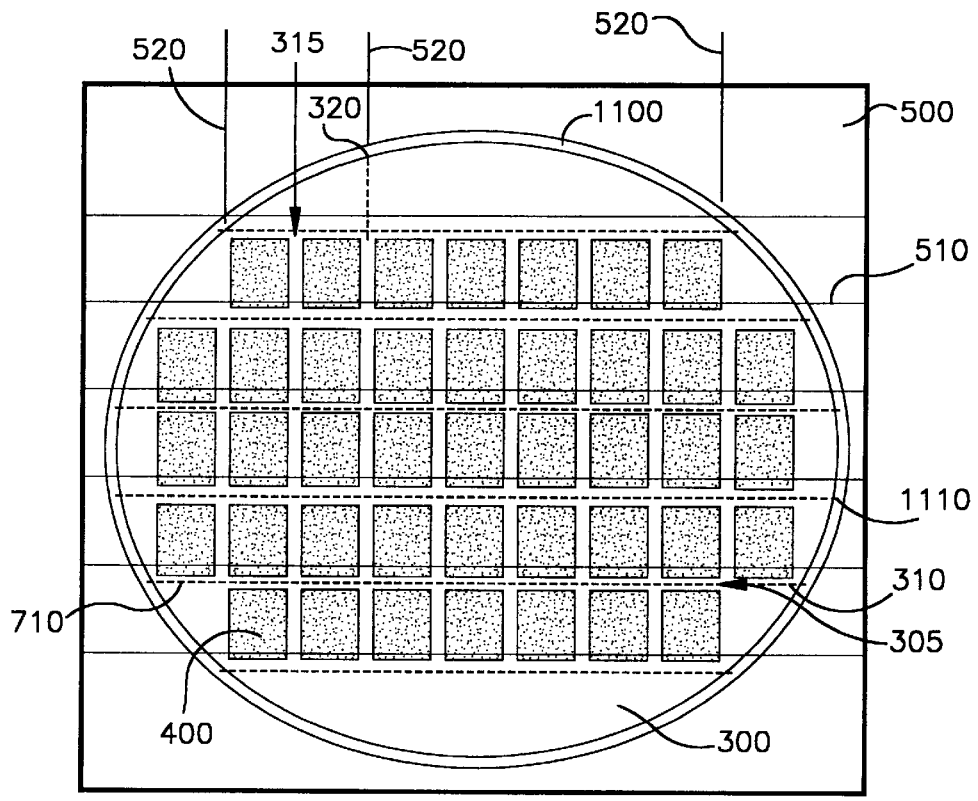
FIG. 3 is a plan view of a silicon wafer substrate having an array of processed active matrix dies and an overlying glass substrate with asymmetric scribes.
Figure 4:
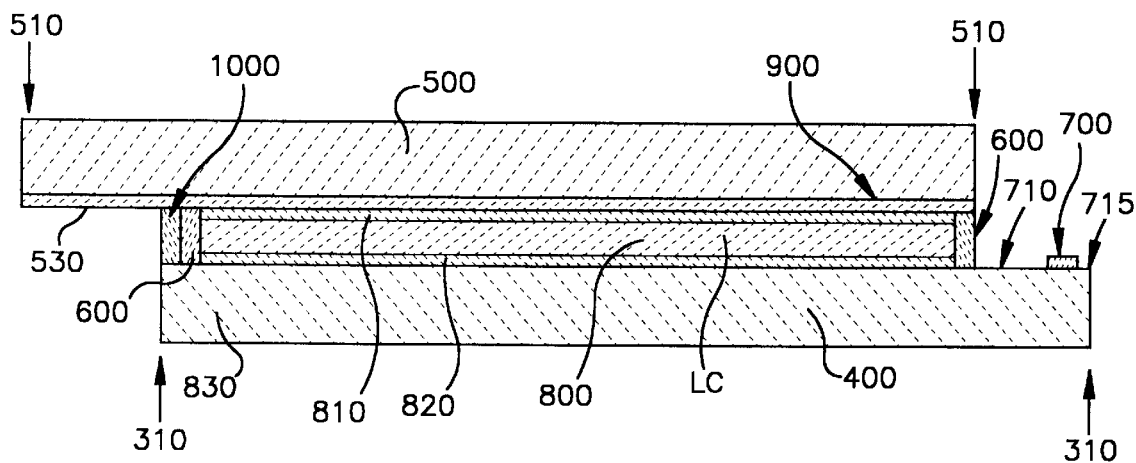
FIG. 4 is a cross-sectional view of an LCOS device manufactured in accordance with the present invention.

FIG. 3 represents in schematic detail a μ LCD arranged on a x-Si wafer/glass laminate. FIG. 4 is a cross-sectional view of a finished μ LCD constructed in accordance with the invention. As shown in FIG. 4, the manufactured product includes a silicon die 400, upper and lower alignment layers 810 and 820, which define walls of a cavity 800 holding a liquid crystal material LC, gasket seals 600, an ITO layer 900 next to the upper alignment layer 810, a glass substrate 500 next to the upper alignment layer 810, and a conductive crossover between the ITO layer and the silicon substrate. The glass substrate overhang on the device is equal in area and extent to the area from the gasket seal 600 to the silicon scribe 310. By this asymmetrical or offset scribing, the distance from the gasket seal to the lower bond pad edge (area defining the bond pad ledge) is a minimum. This represents a huge cost savings in silicon real estate. The glass overhang, which has the same dimensions as the contact ledge, can also serve as an interconnect redundancy for the ITO plate or a repair site for the electrical contact to the ITO plate.

The process proceeds as follows. The order in which the silicon substrate and glass scribes are placed on the respective substrates is somewhat irrelevant. It is the relative location of the scribes, relative to the two substrates that is important. Preferably, the glass substrate horizontal scribes 510 are set to be approximately 150 microns from the edge of the gasket seal 600, in the direction of the bond pads 700 on a contact ledge 710. The general references to horizontal and vertical are for explanation purposes only, and do not limit the scope or application of the invention to any particular arrangement or orientation. The glass substrate horizontal scribes 510 are in effect offset from the scribe street 305 of the silicon the depth of the ledge minus 150 microns. The horizontal scribes 310 on the silicon substrate 300 are placed in the designated scribe streets 305 between any two adjacent die 400. In the case where a die 400 is at the end of a row or column of the array, it is placed at the designated scribe street. Vertical silicon substrate scribes 320 are placed in the designated scribe streets 315 between any two adjacent die 400. In the case where a die 400 is at the end of a row or column, it is placed at the designated scribe street. The vertical silicon substrate scribes 320 and the vertical glass substrate scribes 520 coincide. The units are then separated. Each unit has a bond pad ledge 710 on one side and a glass ITO contact ledge 530 on an opposite side.

Figure 5:
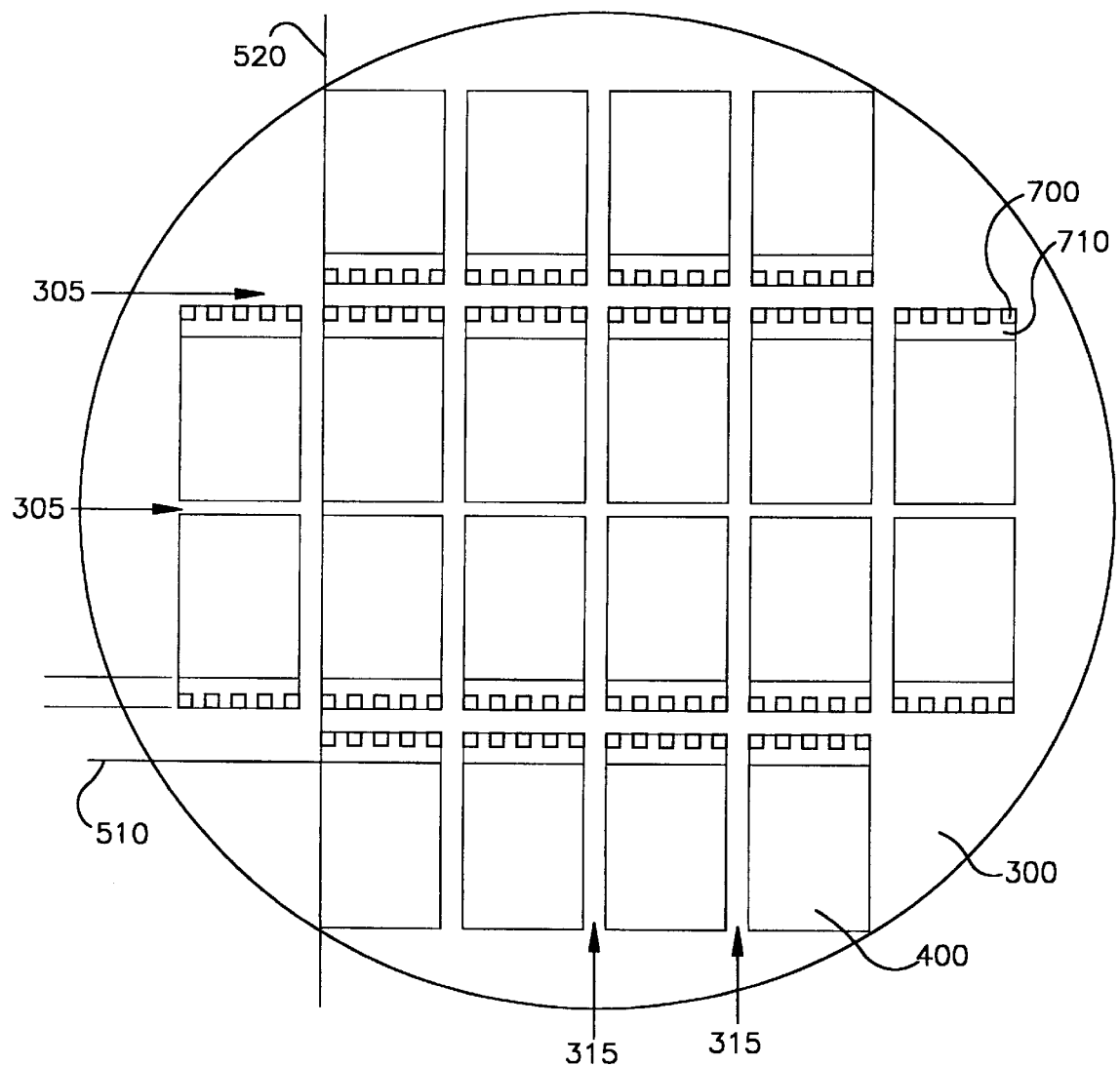
FIG. 5 is a plan view of an asymmetrical die layout on a silicon wafer.

FIG. 5 illustrates an asymmetric layout of dies 400 on a wafer 300 which can also be used to reduce the amount of silicon needed in satisfying the industry established 5-to-1 width-to-thickness ratio for removing glass above the bond pad ledge 710. By arranging the die in the asymmetrical matrix format shown, bond pad ledge to bond pad ledge, the non-functional area of silicon required on each device is greatly reduced from prior art methods. For example, if the distance between the gasket seals of opposing devices in the asymmetric array must be 3.5 mm, and the width of the bond pad ledge is 1 mm, and the scribe streets are 200 microns, the width of the non-functional surface area of silicon between the devices is only 0.65 mm.

The LCD parts may be separated from the array by any of the following methods. The order in which the array (glass first) substrate is scribed is important when conventional solid state cameras are used for viewing and alignment in a scribe machine. This constraint exists unless special infrared viewing cameras are installed which make the silicon transparent and therefore permits viewing of front surface metal fiducials. The scribe tool is aligned with the scribe fiducials and processed. The resultant scribe lines in the glass are used as reference marks to align the silicon substrate scribe lanes. These scribe lanes may be coincident with the glass substrate scribes or uniformly offset. The parts are then separated from the array by venting the scribes on both substrates. Automatic breaking is done by commercially available guillotine or fulcrum breaking machines. The parts can also be separated by hand.

Separation may also by done by glass scribing and partial sawing of the silicon substrate. Sawing requires an additional step at gasket dispense. Sawing is done in the presence of a high-pressure jet of water. Moisture must not be allowed in the area of the fill port or contamination of the polyimide alignment layer will occur. Therefore, at gasket dispense, an additional gasket bead 1100 must be dispensed around the perimeter of the wafer. The end of each scribe/saw lane must be initially left open, as at vent 1110 shown in FIG. 3, to let air vent during the align and press processes. After the array has been pressed and the gasket material cured, the vents are then closed using either the gasket or end-seal material. The glass is then aligned and scribed as described above. Sawing of the wafer is done from the backside of the silicon where the saw streets are aligned relative to the glass scribe lanes described above. The wafer is then sawed to a depth of 50%–90% of its thickness. The parts are then separated as described above.

Alternatively, both the glass and silicon substrates may be partially sawed prior to part separation. With the same gasket seal configuration, vent and seal processes as described above, saw lanes are aligned to fiducials on the glass substrates. The glass is sawed to a depth between 50% and 95% of its thickness. The silicon substrate is sawed and the parts separated as described above.

The parts thus constructed are then filled with a liquid crystal material and end-sealed to complete the process and product. LCD fill chambers used for this step are basically modified vacuum ovens used to degas the liquid crystal and fill the micro-LCD. The liquid crystal is initially drawn into the cells by capillary action and continuously filled by positive pressure from the venting of the vacuum fill chamber. These are well established processes in the liquid crystal display industry. The vacuum oven is typically evacuated to a pressure between 10 to 50 millitorr. During this time the cell is not in contact with the liquid crystal material. The cell is then immersed in a reservoir and the liquid crystal is typically drawn through the fill ports of the cell from fluid troughs or from saturated wicks. Four ledge cell designs are unique in that they require direct and continuous syringe dispensing at the fill port. In all cases, after sometime the vacuum chamber is vented (back-filled typically with nitrogen or argon gas) at some prescribed rate defined by process optimization. It is customary although not a necessary requirement that the cells be slightly overfilled, i.e., that the centers by slightly thicker than the edges. If this is the case then a post end-fill press process step can be invoked.

A post end-fill press and seal process includes the steps of:
1. Pressing the cell until the substrates are again parallel and the spacing between them is uniform. This will cause a small amount of material to be ejected from the cell.
2. The fill port region is wiped clean of all liquid crystal material.
3. A predetermined amount of the end seal material is dispensed.
4. The press pressure is reduced slightly and held constant. This produces the result of wicking in of the end-seal material to a desired depth which insures product integrity.
5. The end seal material is then cured by UV radiation and/or by thermals means.

The invention thus provides efficient methods of manufacture and production arrangements for large scale manufacture of silicon based LCDs which provide substantial savings in the amount of silicon substrate required.

What is claimed is:

1. A method of manufacturing a plurality of liquid crystal devices on a silicon substrate, the method comprising the steps of:
   a) providing a substrate in the form of a silicon substrate having a plurality of processed dies, each die containing an active matrix of display addressing functions for a liquid crystal device, the dies arranged in a generally orthogonal array on the silicon substrate with horizontal and vertical scribe streets between the dies;
   b) preparing the silicon substrate for attachment to a glass substrate;
   c) preparing a glass substrate for attachment to the silicon substrate;
   d) dispensing a sealant material on the silicon substrate;
   e) attaching a glass substrate to the silicon wafer by contact with the sealant material;
   f) forming horizontal scribes in the horizontal scribe streets in the silicon substrate and vertical scribes in the vertical scribe streets in the silicon substrate;
   g) forming vertical scribes in the glass substrate which coincide with the vertical scribe streets in the silicon substrate, and
   h) forming horizontal scribes in the glass substrate adjacent to the horizontal scribe streets in the silicon substrate, whereby the horizontal scribes in the glass substrate intersect each of the dies in a horizontal row in the generally orthogonal array of dies on the silicon substrate;
   i) forming parts by separating the glass substrate and silicon substrate along the respective scribes, and
   j) filling the parts with liquid crystal material between the glass and silicon substrates and sealing the parts between the substrates to form a liquid crystal device.

2. The method of claim 1 wherein each of the dies includes a bond pad ledge, and the dies are arranged in the array with the bond pad ledges in a common position.

3. The method of claim 1 wherein a width dimension of the horizontal scribe streets between the dies on the silicon substrate is not substantially greater than a combined width of a scribe street and two bond pad ledges.

4. The method of claim 2 wherein the horizontal scribes in the glass substrate are proximate to an edge of the bond pad ledges of each of the dies in a row of the orthogonal array.

5. The method of claim 1 wherein the horizontal scribes in the glass substrate are spaced from the horizontal scribes in the silicon substrate a distance approximately equal to a depth dimension of a bond pad ledge of each of the dies.

6. The method of claim 1 further comprising the step of applying a gasket seal between the glass substrate and the silicon substrate, and wherein a scribe in the glass substrate is generally coincident with a gasket seal at one edge of a device, and another scribe in the glass substrate is offset from a gasket seal at an opposite edge of the device.

7. A liquid crystal device package having a silicon substrate bonded to a glass substrate for containing a liquid crystal material between the substrates, the liquid crystal device package manufactured by:
　a) providing a silicon substrate in the form of a wafer having a plurality of dies containing an active matrix for display addressing functions of a liquid crystal device;
　b) applying a gasket seal material to the silicon substrate;
　c) attaching a glass substrate to the silicon substrate;
　d) scribing the silicon substrate between the dies, and scribing the glass substrate generally parallel to the scribes in the silicon substrate, wherein at least one scribe in the glass substrate is not coincident with a scribe in the silicon substrate, and
　e) separating the attached substrates along the scribes in the substrates to form a plurality of liquid crystal device packages, whereby at least one edge of the glass substrate extends beyond a parallel edge of the silicon substrate of a liquid crystal device package.

8. The liquid crystal device package of claim 7 wherein at least one edge of the silicon substrate extends beyond a parallel edge of the glass substrate.

9. The liquid crystal device package of claim 7 wherein an edge of the silicon substrate which does not coincide with an edge of the glass substrate serves as a bond pad ledge.

10. The liquid crystal device package of claim 7 further comprising alignment layers between the substrates, and an ITO layer next to the glass substrate.

11. A combination of scribed substrates for producing a plurality of liquid crystal cases, the combination including a generally planar silicon substrate bonded generally parallel to a generally planar glass substrate, the silicon substrate containing a plurality of dies with scribe streets between the dies, scribes placed in the silicon substrate in the scribe streets, scribes in the glass substrate which are aligned with scribes in the silicon substrate in one direction, and which are not aligned with scribes in the silicon substrate in another direction.

12. The combination of claim 11 wherein the scribes in the substrates are generally orthogonal, and scribes in the glass substrate intersect active matrix dies on the silicon substrate.

13. The combination of claim 11 further comprising alignment layers, a gasket seal, an ITO layer and a conductive crossover between the substrates.

14. The combination of claim 11 wherein the scribes on the substrates are generally orthogonal.

15. A combination of scribed substrates for producing a plurality of liquid crystal cases, the combination including a generally planar silicon substrate bonded generally parallel to a generally planar glass substrate, the silicon substrate containing a plurality of active matrix dies with bond pads at one edge of each die, the dies arranged upon the silicon substrate so that the bond pads are generally aligned in an opposing arrangement;
　scribe streets in the silicon substrate between the dies;
　scribes in the scribe streets in the silicon substrate;
　a glass substrate attached to the silicon substrate, and scribes in the glass substrate which intersect the dies.

16. The combination of claim 15 wherein the scribes are generally orthogonal, and the scribes in one direction on the silicon substrate and glass substrate coincide, and the scribes in another direction on the silicon substrate and glass substrate are offset.

* * * * *